(12) United States Patent
Yadav

(10) Patent No.: US 8,578,468 B1
(45) Date of Patent: Nov. 5, 2013

(54) MULTI-FACTOR CLIENT AUTHENTICATION

(75) Inventor: Navindra Yadav, Cupertino, CA (US)

(73) Assignee: Google Inc.

( * ) Notice: Subject to any disclaimer, the term of this patent is extended or adjusted under 35 U.S.C. 154(b) by 0 days.

(21) Appl. No.: 13/475,063

(22) Filed: May 18, 2012

(51) Int. Cl.
*H04L 12/28* (2006.01)
*H04L 12/22* (2006.01)

(52) U.S. Cl.
USPC .......................................... 726/13; 713/154

(58) Field of Classification Search
None
See application file for complete search history.

(56) References Cited

PUBLICATIONS

A Path Information Caching and Aggregation Approach to Traffic Source Identification. Hsu et al. IEEE(2003).*

StackPi: New Packet Marking and Filtering Mechanisms for DDoS and IP Spoofing Defense. Yaar et al. IEEE(2006).*

* cited by examiner

*Primary Examiner* — Venkat Perungavoor
(74) *Attorney, Agent, or Firm* — Honigman Miller Schwartz and Cohn LLP

(57) ABSTRACT

A method of client authentication that includes receiving an Internet protocol source address of a client packet and determining a packet origination, a network connection point, and a network path of the client packet. The method further includes comparing the determined packet origination with at least one packet origination associated with the client, comparing the determined network connection point with at least one network connection point associated with the client, and assessing a compatibility between the determined network path and at least one of the determined packet origination or the determined network connection point. The method includes signaling execution of client authentication challenges when either of the two comparisons fails and/or the determined network path is incompatible with at least one of the determined packet origination or the determined network connection point.

26 Claims, 12 Drawing Sheets

MULTI-FACTOR CLIENT AUTHENTICATION

TECHNICAL FIELD

This disclosure relates to client authentication using multiple factors.

BACKGROUND

In general, information security entails protecting information from theft, loss, and corruption. Internet service providers may implement procedures to prevent phishing attacks and compromised user accounts. Attackers may use social engineering attacks on website users through simple phishing and sophisticated spear phishing attacks. Key stroke logging programs may record a user's login information, leading to a compromised user account. A service provider may implement multiple authentication challenges to verify a user. These authentication challenges may include multiple questions, cookies, etc.

SUMMARY

One aspect of the disclosure provides a method of client authentication that includes providing one or more authentication signals based on an Internet protocol (IP) source address to improve a client's experience by challenging the client with multiple levels of authentication only after receiving a signal indicating a possible attack or compromised account. The method includes receiving an Internet protocol source address of a client packet and determining a packet origination, a network connection point, and a network path of the client packet based on the Internet protocol source address. The method further includes comparing the determined packet origination with at least one packet origination associated with the client, comparing the determined network connection point with at least one network connection point associated with the client, and assessing a compatibility between the determined network path and at least one of the determined packet origination or the determined network connection point. The method includes signaling execution of one or more client authentication challenges when at least one of the determined packet origination fails to match the at least one packet origination associated with the client, the determined network connection point fails to match the at least one network connection point associated with the client, or the determined network path is incompatible with at least one of the determined packet origination or the determined network connection point.

Implementations of the disclosure may include one or more of the following features. The packet origination may include at least one of a geographical location, a domain name, a connection speed, an Internet service provider, or an entity identification. In some implementations, the method includes querying a data source to retrieve a geographical location corresponding to the Internet protocol source address. The method may include associating the packet origination with the client after successful execution of the one or more client authentication challenges. Moreover, the method may include disassociating the packet origination from the client after a threshold period of time.

In some implementations, the method includes querying a data source to retrieve the network connection point corresponding to the Internet protocol source address. In some examples, the method includes determining a longest prefix match of the Internet protocol source address to determine the network connection point. Moreover, a service provider can be determined for the network connection point. The method may include associating the network connection point with the client after successful execution of the one or more client authentication challenges. After a threshold period of time, the method may include disassociating the network connection point from the client.

The method may include extracting a network prefix from the Internet protocol source address and determining at least one of the network origination, the network connection point, or the network path. In some examples, the method includes determining a compatibility between the packet origination and the network connection point and signaling execution of one or more client authentication challenges when the packet origination is incompatible with the network connection point. The method may include determining an internet service provider corresponding to the Internet protocol source address, determining whether the internet service provider services the packet origination and signaling execution of one or more client authentication challenges when the internet service provider fails to service the packet origination.

In some implementations, the method includes comparing the Internet protocol source address against a list of known unassigned Internet protocol addresses and signaling execution of one or more client authentication challenges when the Internet protocol source address matches an unassigned Internet protocol addresses. This allows a service provider to quickly identify IP address spoofing.

The method may include determining a sequence of autonomous system identifiers corresponding to the network path of the client packet, comparing the autonomous system identifiers of the network path against a set of suspicious autonomous system identifiers, and signaling execution of one or more client authentication challenges when at least one of the autonomous system identifiers of the network path matches a suspicious autonomous system identifier.

Another aspect of the disclosure provides a security system that includes an extractor in communication with a comparer. The extractor receives an Internet protocol source address of a client packet and determines a packet origination, a network connection point, and a network path of the client packet based on the Internet protocol source address. The comparer compares the determined packet origination with at least one packet origination associated with the client and compares the determined network connection point with at least one network connection point associated with the client. The comparer also assesses a compatibility between the determined network path and at least one of the determined packet origination or the determined network connection point. The comparer signals execution of one or more client authentication challenges when at least one of: 1) the determined packet origination fails to match the at least one packet origination associated with the client, 2) the determined network connection point fails to match the at least one network connection point associated with the client, or 3) the determined network path is incompatible with at least one of the determined packet origination or the determined network connection point.

In some implementations, the packet origination includes at least one of a geographical location, a domain name, a connection speed, an Internet service provider, or an entity identification. The extractor may query a data source to retrieve a geographical location corresponding to the Internet protocol source address. In some examples, the security system includes an attributer associating the packet origination with the client after successful execution of the one or more client authentication challenges. The attributer may disassociate the packet origination from the client after a threshold period of time.

In some implementations, the extractor queries a data source to retrieve the network connection point corresponding to the Internet protocol source address. The extractor may determine a longest prefix match of the Internet protocol source address to determine the network connection point. A service provider corresponding to the network connection point can be determined by the extractor. In some examples, the security system includes an attributer that associates the network connection point with the client after successful execution of the one or more client authentication challenges. The attributer may disassociate the network connection point from the client after a threshold period of time.

The extractor may extract a network prefix from the Internet protocol source address and determine at least one of the network origination, the network connection point, or the network path. The comparer may determine a compatibility between the packet origination and the network connection point and signal execution of one or more client authentication challenges when the packet origination is incompatible with the network connection point. In some examples, the extractor determines an internet service provider corresponding to the Internet protocol source address and the comparer determines whether the internet service provider services the packet origination. The comparer signals execution of one or more client authentication challenges when the internet service provider fails to service the packet origination.

In some implementations, the comparer compares the Internet protocol source address against a list of known unassigned Internet protocol addresses and signals execution of one or more client authentication challenges when the Internet protocol source address matches an unassigned Internet protocol addresses. The extractor may determines a sequence of autonomous system identifiers corresponding to the network path of the client packet and the comparer compares the autonomous system identifiers of the network path against a set of suspicious autonomous system identifiers. The comparer signals execution of one or more client authentication challenges when at least one of the autonomous system identifiers of the network path matches a suspicious autonomous system identifier.

Yet another aspect of the disclosure provides a computer program product encoded on a computer readable storage medium comprising instructions that when executed by a data processing apparatus cause the data processing apparatus to perform operations including receiving an Internet protocol source address of a client packet and determining a packet origination, a network connection point, and a network path of the client packet based on the Internet protocol source address. The operations further include comparing the determined packet origination with at least one packet origination associated with the client, comparing the determined network connection point with at least one network connection point associated with the client, and assessing a compatibility between the determined network path and at least one of the determined packet origination or the determined network connection point. The operation include signaling execution of one or more client authentication challenges when at least one of the determined packet origination fails to match the at least one packet origination associated with the client, the determined network connection point fails to match the at least one network connection point associated with the client, or the determined network path is incompatible with at least one of the determined packet origination or the determined network connection point.

The packet origination may include at least one of a geographical location, a domain name, a connection speed, an Internet service provider, or an entity identification. In some implementations, the operations include querying a data source to retrieve a geographical location corresponding to the Internet protocol source address. The operations may include associating the packet origination with the client after successful execution of the one or more client authentication challenges. Moreover, the operations may include disassociating the packet origination from the client after a threshold period of time.

In some implementations, the operations include querying a data source to retrieve the network connection point corresponding to the Internet protocol source address. In some examples, the operations include determining a longest prefix match of the Internet protocol source address to determine the network connection point. Moreover, a service provider can be determined for the network connection point. The operations may include associating the network connection point with the client after successful execution of the one or more client authentication challenges. After a threshold period of time, the operations may include disassociating the network connection point from the client.

The operations may include extracting a network prefix from the Internet protocol source address and determining at least one of the network origination, the network connection point, or the network path. In some examples, the operations include determining a compatibility between the packet origination and the network connection point and signaling execution of one or more client authentication challenges when the packet origination is incompatible with the network connection point. The operations may include determining an internet service provider corresponding to the Internet protocol source address, determining whether the internet service provider services the packet origination and signaling execution of one or more client authentication challenges when the internet service provider fails to service the packet origination.

In some implementations, the operations include comparing the Internet protocol source address against a list of known unassigned Internet protocol addresses and signaling execution of one or more client authentication challenges when the Internet protocol source address matches an unassigned Internet protocol addresses. This allows a service provider to quickly identify IP address spoofing.

The operations may include determining a sequence of autonomous system identifiers corresponding to the network path of the client packet, comparing the autonomous system identifiers of the network path against a set of suspicious autonomous system identifiers, and signaling execution of one or more client authentication challenges when at least one of the autonomous system identifiers of the network path matches a suspicious autonomous system identifier.

Another aspect of the disclosure provides a method of client authentication that includes receiving an Internet protocol source address of a client, extracting a media access control address from the Internet protocol source address, comparing the extracted media access control address with at least one client media access control address associated with the client, and signaling execution of one or more client authentication challenges when the extracted media access control address fails to match the at least one client media access control address associated with the client.

Implementations of the disclosure may include one or more of the following features. In some implementations, the method includes extracting an interface identifier from the Internet protocol source address and extracting the media access control address from the interface identifier. The Internet protocol source address may be an IPv6 address. In some examples, the method includes associating the extracted media access control address with the client after successful execution of the one or more client authentication challenges. Moreover, an age can be attributed to the extracted media access control address, such that the method may include disassociating the extracted media access control address from the client after a threshold period of time (e.g., an age of 2-6 months).

In some implementations, the method includes extracting an organizationally unique identifier from the media access control address. A source identifier can be determined from the organizationally unique identifier. The source identifier may include at least one of an entity identity, a source device type, or a source device unique identifier. The method may include comparing the determined source identifier with at least one source identifier associated with the client and signaling execution of one or more client authentication challenges when the determined source identifier fails to match the at least one source identifier associated with the client. The method may include associating the determined source identifier with the client after successful execution of the one or more client authentication challenges. Moreover, the determined source identifier can be disassociated from the client after a threshold period of time.

The method, in some implementations, includes determining a source device type and a source software application type from the media access control address and then comparing a compatibility between the determined source device type and the determined source software application type. The method may include signaling execution of one or more client authentication challenges when the determined source device type is incompatible with the determined source software application type.

Another aspect of the disclosure provides a security system that includes an extractor and a comparer. The extractor receives an Internet protocol source address of a client and extracts a media access control address from the Internet protocol source address. The comparer compares the extracted media access control address with at least one client media access control address associated with the client and signals execution of one or more client authentication challenges when the extracted media access control address fails to match the at least one client media access control address associated with the client.

In some implementations, the extractor extracts an interface identifier from the Internet protocol source address and extracts the media access control address from the interface identifier. The Internet protocol source address may be an IPv6 address.

The security system may include an attributer that associates the extracted media access control address with the client after successful execution of the one or more client authentication challenges. The attributer may disassociate the extracted media access control address from the client after a threshold period of time.

In some implementations, the extractor extracts an organizationally unique identifier from the media access control address and may determine a source identifier from the organizationally unique identifier. The source identifier may include at least one of an entity identity, a source device type, or a source device unique identifier. The comparer may compare the determined source identifier with at least one source identifier associated with the client and signal execution of one or more client authentication challenges when the determined source identifier fails to match the at least one source identifier associated with the client. In some examples, the security system includes an attributer that associates the determined source identifier with the client after successful execution of the one or more client authentication challenges. Moreover, the attributer may disassociate the determined source identifier from the client after a threshold period of time.

The extractor may determine a source device type and a source software application type from the media access control address. The comparer may compare a compatibility between the determined source device type and the determined source software application type and signal execution of one or more client authentication challenges when the determined source device type is incompatible with the determined source software application type.

Yet another aspect of the disclosure provides a computer program product encoded on a computer readable storage medium comprising instructions that when executed by a data processing apparatus cause the data processing apparatus to perform operations. The operations include receiving an Internet protocol source address of a client, extracting a media access control address from the Internet protocol source address, comparing the extracted media access control address with at least one client media access control address associated with the client, and signaling execution of one or more client authentication challenges when the extracted media access control address fails to match the at least one client media access control address associated with the client.

In some implementations, the operations include extracting an interface identifier from the Internet protocol source address and extracting the media access control address from the interface identifier. The Internet protocol source address may be an IPv6 address. In some examples, the operations include associating the extracted media access control address with the client after successful execution of the one or more client authentication challenges. Moreover, an age can be attributed to the extracted media access control address, such that the method may include disassociating the extracted media access control address from the client after a threshold period of time (e.g., an age of 2-6 months).

In some implementations, the operations include extracting an organizationally unique identifier from the media access control address. A source identifier can be determined from the organizationally unique identifier. The source identifier may include at least one of an entity identity, a source device type, or a source device unique identifier. The operations may include comparing the determined source identifier with at least one source identifier associated with the client and signaling execution of one or more client authentication challenges when the determined source identifier fails to match the at least one source identifier associated with the client. The operations may include associating the determined source identifier with the client after successful execution of the one or more client authentication challenges. Moreover, the determined source identifier can be disassociated from the client after a threshold period of time.

The operations, in some implementations, include determining a source device type and a source software application type from the media access control address and then comparing a compatibility between the determined source device type and the determined source software application type. The operations may include signaling execution of one or more client authentication challenges when the determined source device type is incompatible with the determined source software application type.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A service provider may challenge a client's authentication multiple times (e.g., via questions, passwords, keys, etc.) to prevent unauthorized access to information or a service. The client experience may diminish, however, when the service provider uses multiple client authentication challenges every time the client attempts to access the information or service. Instead, the service provider may enhance the client's experience by executing multiple client authentication challenges only after receiving authentication signals based on the client's Internet protocol address (e.g., an IPv4 or IPv6 address). The authentication signals can provide an indication of likelihood of whether an attacker is using packet header forgery or Internet protocol address spoof to gain unauthorized access to information or services.

Figure 1:
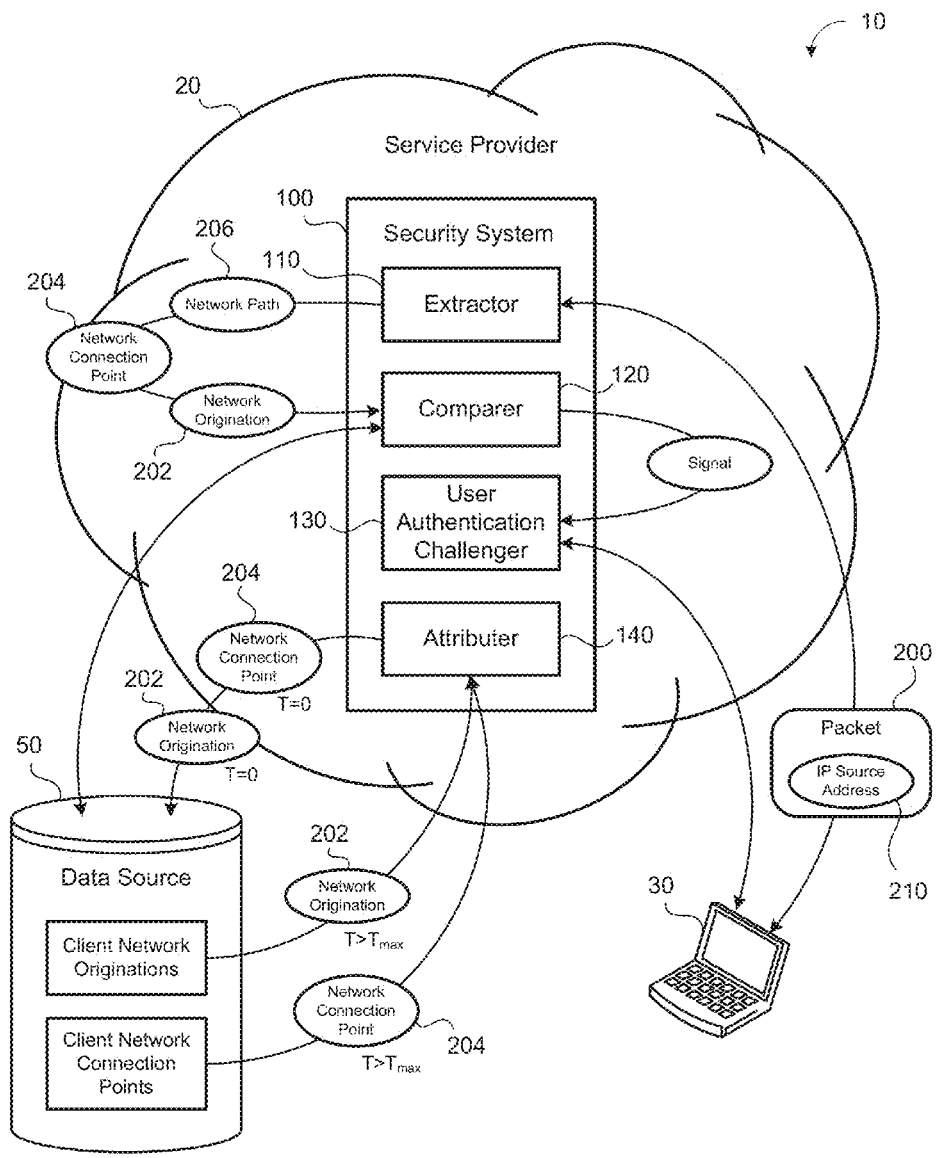
FIG. 1 is a schematic view of an exemplary network system.
Figure 2A:
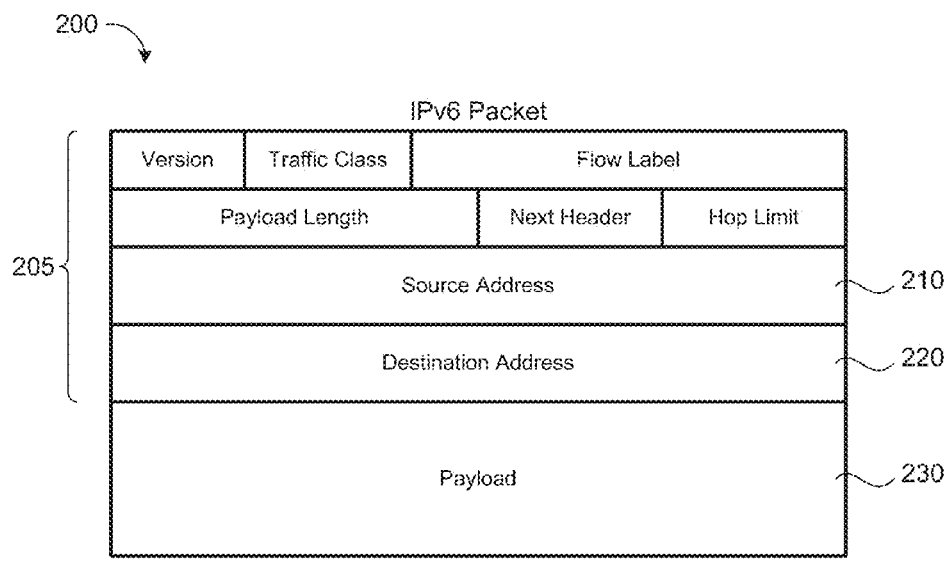
FIG. 2A is a schematic view of an exemplary data packet.
Figure 2B:
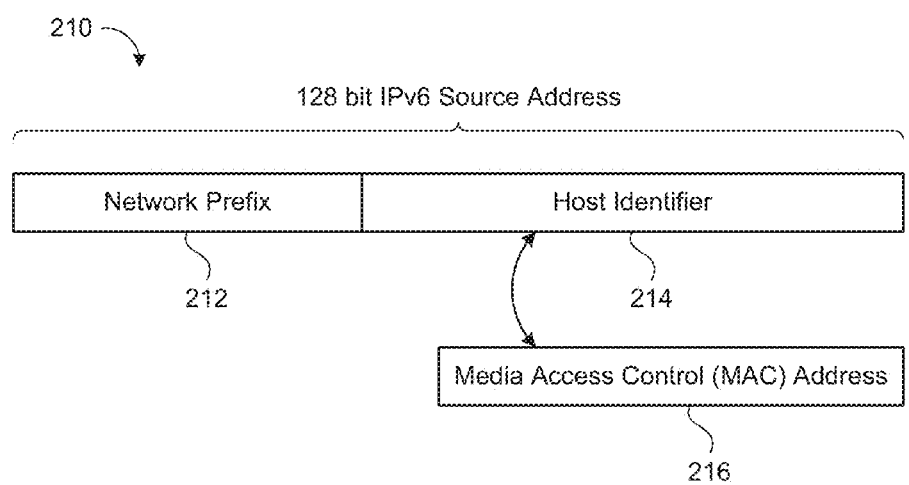
FIG. 2B is a schematic view of an exemplary Internet protocol address.

Referring to FIGS. 1-2B, in some implementations, a network system 10 includes a service provider 20 in communication with a client 30. The service provider 20 includes a security system 100 that receives a data packet 200 from the client 30. Referring to FIG. 2A, an Internet protocol (IP) packet 200 has two parts: a header 205 and a payload 230. The header 205 includes a source address 210 and a destination address 220. The example shown illustrates an IPv6 packet 200, which is 128 bits long. The header 205 generally occupies the first 40 octets (320 bits) of the IPv6 packet and contains the source address 210, the destination address 220, traffic classification options, a hop counter, and a next header pointing to the next element in the chain of headers, if any. Extension headers carry options that can be used for special treatment of a packet in the network, e.g., for routing, fragmentation, and for security using the IPsec framework. An IPv4 packet 200 contains a source address 210 and a destination address 220 as well.

The source address 210 is the address of the machine that sent the packet 200, whereas the destination address 220 is the address of the machine or set of destination machines to which the frame has been sent. As shown in FIG. 2B, the source address 210 is a unicast IP address having two parts: a network prefix 212 and a host identifier 214. Malicious activity can be detected using the network prefix 212 and/or the host identifier 214.

Referring to FIG. 1, in some implementations, the security system 100 includes an extractor 110 and a comparer 120. When the service provider 20 receives a data packet 200 from a client 30, the security system 100 determines an authenticity of the client 30 (e.g., validates that the received data packet 200 originated from an authorized client 30). The extractor 110 receives the data packet 200 and extracts an Internet protocol (IP) source address 210 (e.g., an IPv6 address) of the client 30. In some examples, another module receives the data packet 200 and communicates the IP source address 210 to the extractor 110. The extractor 110 determines a packet origination 202 (e.g., an IP address geolocation) based on the IP source address 210 (e.g., based on the network prefix 212 and/or the host identifier 214). In some examples, the extractor 110 queries a data source 50 to retrieve the packet origination 202 corresponding to the IP source address 210. The packet origination 202 may include information such as a country, a region, a city, a postal/zip code, a latitude, a longitude and/or a time zone. In some implementations, the packet origination 202 includes other parameters such as a domain name, connection speed, Internet service provider (ISP), language, proxies, company name, US DMA/MSA, NAICS codes, and/or home/business. The comparer 120 compares the determined packet origination 202 with at least one packet origination 202 associated with the client 30.

Based on the comparison, the comparer 120 signals execution of one or more client authentication challenges when the determined packet origination 202 fails to match at least one packet origination 202 associated with the client 30. An authentication challenger 130 may receive the signals sent by the comparer 120 and execute multiple client authentication challenges, such as prompts for questions, passwords, keys, etc.

The comparer 120 may compare the IP source address 210 against a list of known unassigned IP addresses (e.g., stored by the data source 50) and signal the authentication challenger 130 to execute additional security measures when the IP source address 210 matches an unassigned IP address.

In some implementations, the security system 100 includes an attributer 140 that associates the determined packet origination 202 with the client 30 after successful execution of the one or more client authentication challenges. The security system 100 may store the packet originations 202 associated with the client 30 in a data source 50 (e.g., storage device, local and/or remote memory, cloud storage, etc.). Each associated packet origination 202 may receive an age attribute having a time T of zero when initially associated. The attributer 140 may disassociate a packet origination 202 from the client 30 after a threshold period of time $T_{max}$, for example, an age T>3 weeks. Other threshold time periods are possible as well, such as 3 days, 3 months, 3 years, etc. Moreover, in some examples, the comparer 120 checks the ages of the client associated packet origination 202 when comparing the associated packet originations 202 with the extracted packet origination 202. If some or all of the associated packet originations 202 have an age within a threshold range of an expiration age, the comparer 120 may signal the authentication challenger 130 to execute multiple client authentication challenges.

In some implementations, the extractor 110 determines a network connection point 204 of the client packet 200 based on the IP source address 210. The network connection point 204 is a data network location from where the client packet 200 originated. The network connection point 204 is different from the packet origination 202. The extractor 110 may determine the network connection point 204 by finding the longest prefix match for the IP source address 210 (e.g., using Internet Address Registries). Longest prefix match (also called maximum prefix length match) refers to an algorithm used by routers in Internet Protocol (IP) networking to select an entry from a routing table. Each entry in a routing table may specify a network, so one IP address may match more than one routing table entry. The table entry with the highest subnet mask is the longest prefix match. The data source 50 may store a set of legitimate/authenticated network connection points 204 (i.e., data network locations) where the client 30 accessed the service provider 20 in the past. The extractor 110 may query the data source 50 to find the longest prefix match to determine the network connection point 204.

Figure 3:
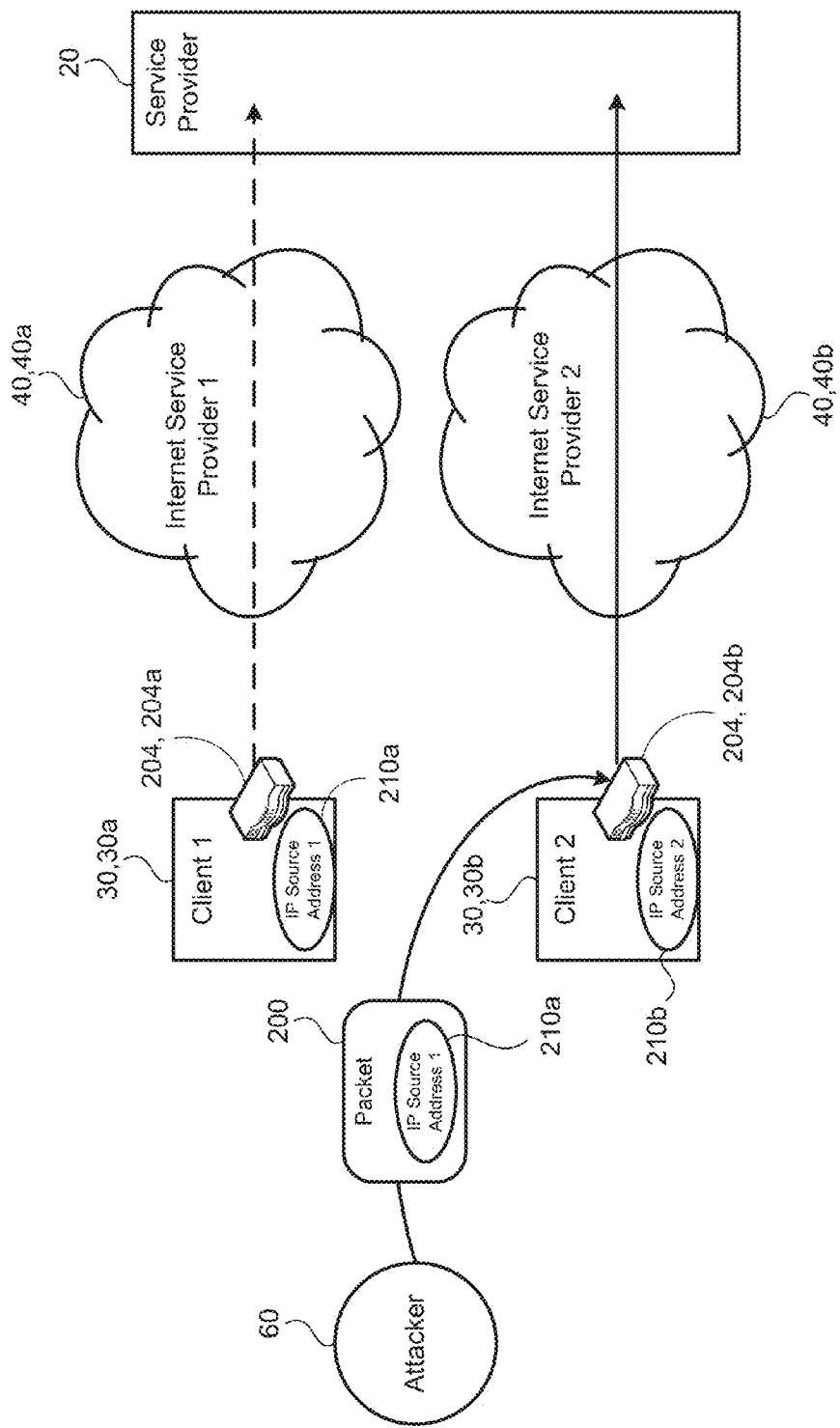
FIG. 3 is a schematic view of an exemplary network system.

Referring to FIG. 3, in some implementations, the network connection point 204 includes information on an Internet service provider (ISP) 40 where the packet 200 originated. Each Internet service provider 40 has a set of associated IP addresses 210, 220. The extractor 110 may determine the Internet service provider 40 associated with IP source address 210, for example, by querying the data source 50 or other information source.

The comparer 120 may compare the determined network connection point 204 with at least one network connection point 204 associated with the client 30. For example, referring to FIG. 3, the comparer 120 may compare the Internet service provider 40 associated with the determined network connection point 204 with any previously associated Internet service providers 40 of the client 30. Based on the comparison, the comparer 120 signals to the authentication challenger 130 execution of one or more client authentication challenges when the determined network connection point 204 fails to match at least one network connection point 204 associated with the client 30.

The attributer 140 may associate the network connection point 204 with the client 30 after successful execution of the one or more client authentication challenges. Each network connection point 204 may receive an age attribute having a time T of zero when initially associated. Moreover, the attributer 140 may disassociate a network connection point 204 from the client 30 after a threshold period of time $T_{max}$.

Referring to the example shown in FIG. 3, a first client 30a may use a first Internet service provider 40a to access the Internet, while a second client 30b may use a second Internet service provider 40b to access the Internet. If an attacker 60 gains access to a compromised account of the first client 30a for the service provider 20, the attacker 60 may attempt to send a data packet 200 to the service provider 20 through a second client 30b (e.g., a compromised computing device) to access the compromised account from an undisclosed remote location. With address spoofing, the data packet 200 may appear to originate from the first client 30a by having a corresponding first IP source address 210a, even though the data packet 200 is originating from the second client 30b having a second IP source address 210b.

The security system 100 of the service provider 20 receives the data packet 200. The extractor 110 extracts the IP source address 210 and determines the packet origination 202 and a network connection point 204. In the example shown in FIG. 3, the spoofed data packet 200 will have an IP source address 210a corresponding to the first client 30a. As a result, the packet origination 202a will correspond to the first client 30a; however, the network connection point 204b will correspond to the second client 30b. The comparer 120 may compare a compatibility between the packet origination 202 and the network connection point 204 and signal the authentication challenger 130 to execute additional client authentication challenges when the packet origination 202 and the network connection point 204 are incompatible. For example, if the IP source address 210 of the data packet 200 is associated with the first Internet service provider 40a, yet the determined network connection point 204b indicates that the data packet 200 is originating from the second Internet service provider 40b, the comparer 120 may signal for execution of additional client authentication measures to determine whether IP address spoofing occurred.

Figure 4:
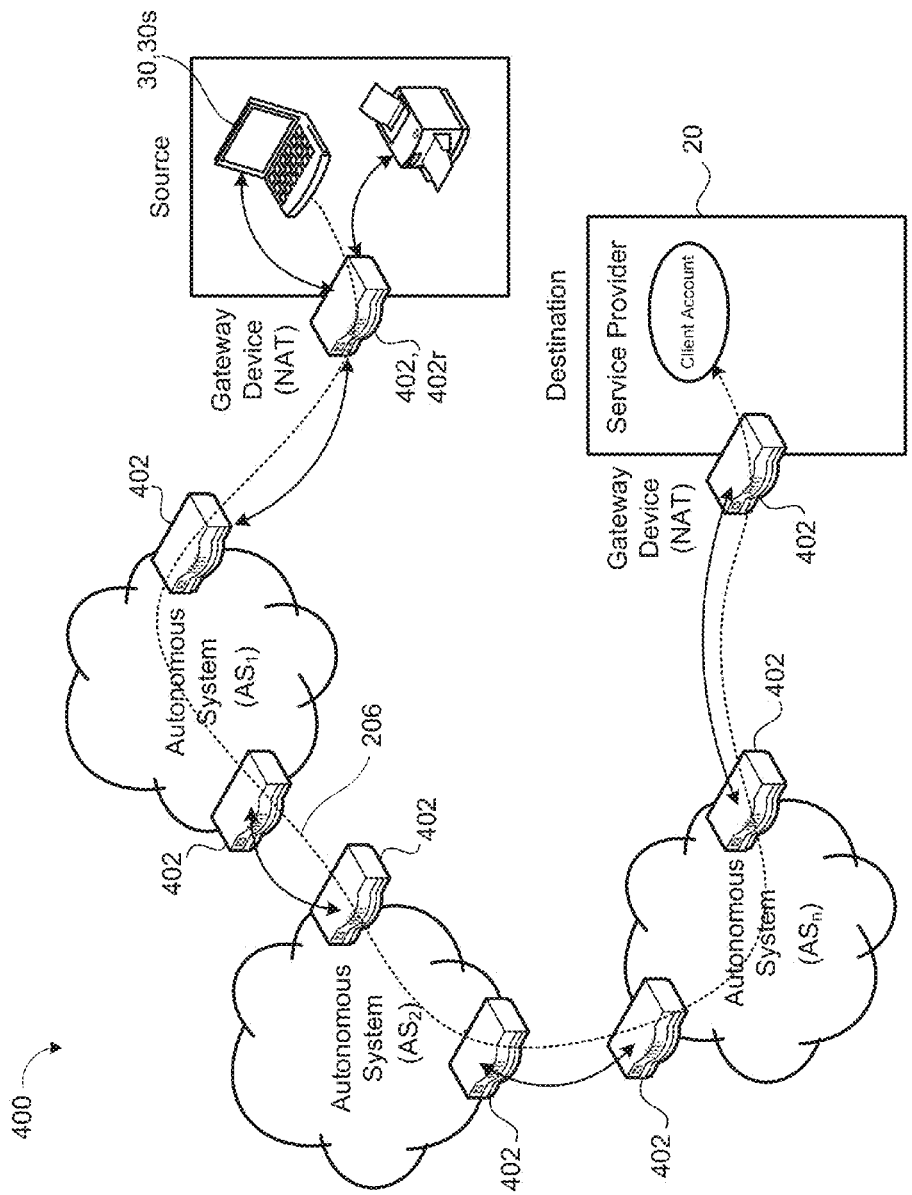
FIG. 4 provides a schematic view of an exemplary network path of a data packet traveling from a source to a destination through various sets of networks.

FIG. 4 provides a schematic view of an exemplary network path 206 of a data packet 200 traveling from a source to a destination through various sets of networks. In some implementations, the extractor 110 determines a network path 206 of the data packet 200 using the corresponding IP source address 210 (e.g., using the network prefix 212). The extractor 110 may query the data source 50, which may store autonomous system paths for network prefixes 212 to determine the network path 206. Within the Internet, an autonomous system (AS) is a collection of connected Internet protocol (IP) routing prefixes under the control of one or more network operators (i.e., Internet service providers (ISPs) 40) that present a common, clearly defined routing policy (e.g., border gateway protocol) to the Internet. Each autonomous system has an associated unique identifier (AS ID) assigned to its networks. The network path 206 travelled by a data packet 200 from a source to a destination through various sets of networks can be mapped as a sequence of autonomous system identifiers $AS_n$.

In general, autonomous systems $AS_n$ having networks under a common administrator may share a common routing policy for communication therebetween, such as border gateway protocol (BGP). Within each autonomous system $AS_n$, the routing protocol typically entails an interior gateway protocol (IGP), such as a link state protocol.

Link state protocol generally relies on a routing algorithm executed at each network node 402. Each node 402 on the network advertises, throughout the network, links to neighboring nodes 402 and provides a cost associated with each link, which can be based on any appropriate metric such as link bandwidth or delay and is typically expressed as an integer value. A link may have an asymmetric cost, that is, the cost in a first direction along a link may be different from the cost in a second, reverse direction. Based on the advertised information in the form of a link state packet (LSP) each node 402 constructs a link state database (LSDB), which is a map of the entire network topology, and from that constructs generally a single route to each available node 402 based on an appropriate algorithm such as, a shortest path first (SPF) algorithm. As a result, a spanning tree is constructed, rooted at the node and showing a communication path including intermediate nodes to each available destination node.

The results of the spanning tree can be stored in a routing information base (RIB) and based on these results the forwarding information base (FIB) or forwarding table is updated to control forwarding of packets appropriately. When there is a network change a link state packet representing the change is flooded through the network by each node adjacent the change, each node receiving the link state packet sends it to each adjacent node. As a result, when a data packet 200 for a destination node 402, 30s arrives at a node 402, the node 402 identifies a route to that destination and forwards the packet 200 to the next node 402 along that route. The next node 402 repeats this step and so forth.

Multiple client devices can appear to share IP addresses, either because they are part of a shared hosting web server environment or because a network address translator (NAT) or proxy server acts as an intermediary agent on behalf of its clients, in which case the real originating IP addresses may be hidden from a server receiving a request.

Generally, a NAT device maps TCP (transmission control protocol) or UDP (client datagram protocol) port numbers outside the private network to individual private addresses inside the private network. For example, the port numbers can be site-specific extensions to an IP address. In autonomous systems $AS_n$, each node 402 can be a NAT device.

In residential networks, NAT functions usually take place in a residential gateway device 402r. In this scenario, computing devices connected to the residential gateway device 402r have private IP addresses and the residential gateway device 402r has a public address to communicate with the Internet, allowing several computing devices to share one public IP address.

After determining the network path 206 of the client packet 200 based on the IP source address 210, the comparer 120 may assess a compatibility between the determined network path 206 and at least one of the determined packet origination 202 or the determined network connection point 204. The comparer 120 signals execution of one or more client authentication challenges when the determined network path 206 is incompatible with at least one of the determined packet origination 202 or the determined network connection point 204.

Figure 5:
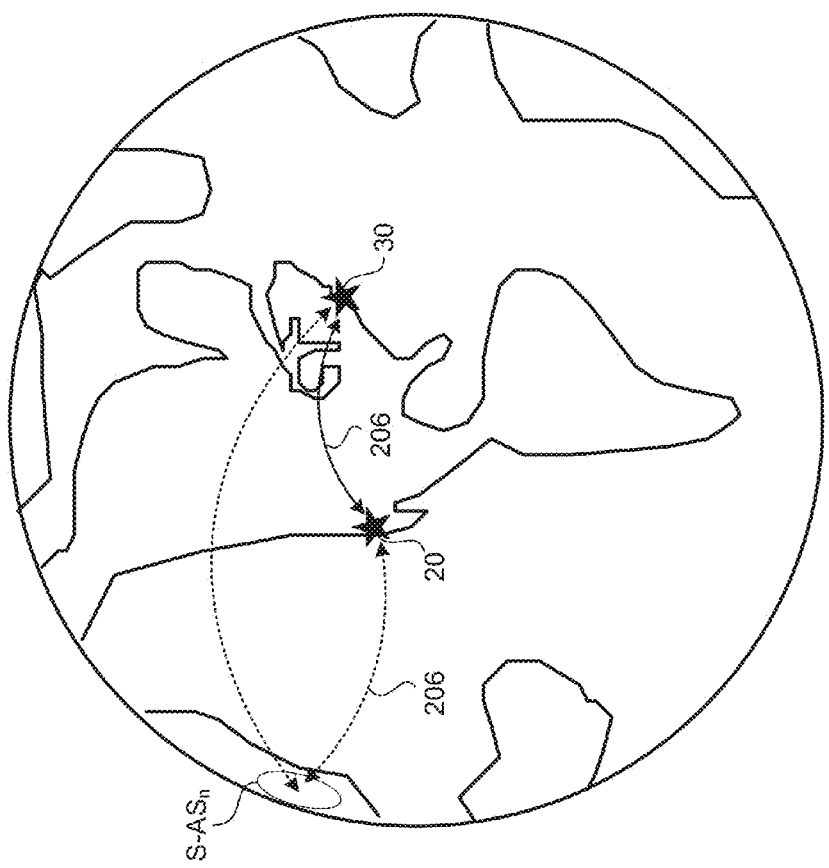
FIG. 5 provides a schematic view of an exemplary network path of a data packet traveling from a source to a destination through a suspicious set of networks.

Referring also to FIG. 5, when the security system 100 receives a data packet 200 requesting access to a client's account, the extractor 110 reverse maps the network path 206 of the packet 200 to the source client 30s. The comparer 120 may determine of the network path 206 is compatible with the corresponding packet origination 202 and the network connection point 204. For example, if the packet origination 202 indicates that the packet originated in Boston, Mass. and the service provider 20 is located in California, a network path 206 traveling through China may raise a signal for additional client authentication measures. Moreover, the comparer 120 may compare the network path 206 against a list of suspicious autonomous systems AS (e.g., stored in the data source 50). If the network path 206 includes an autonomous system identifier corresponding to a suspicious autonomous system S-$AS_n$, the comparer 120 may signal the authentication challenger 130 to execute additional client authentication measures. In some examples, the comparer 120 compares the determined network path 206 against predetermined network paths 206 (e.g., stored in the data source 50) and signals execution of additional client authentication measures when the determined network path 206 fails to match any predetermined network paths 206.

Figure 6:
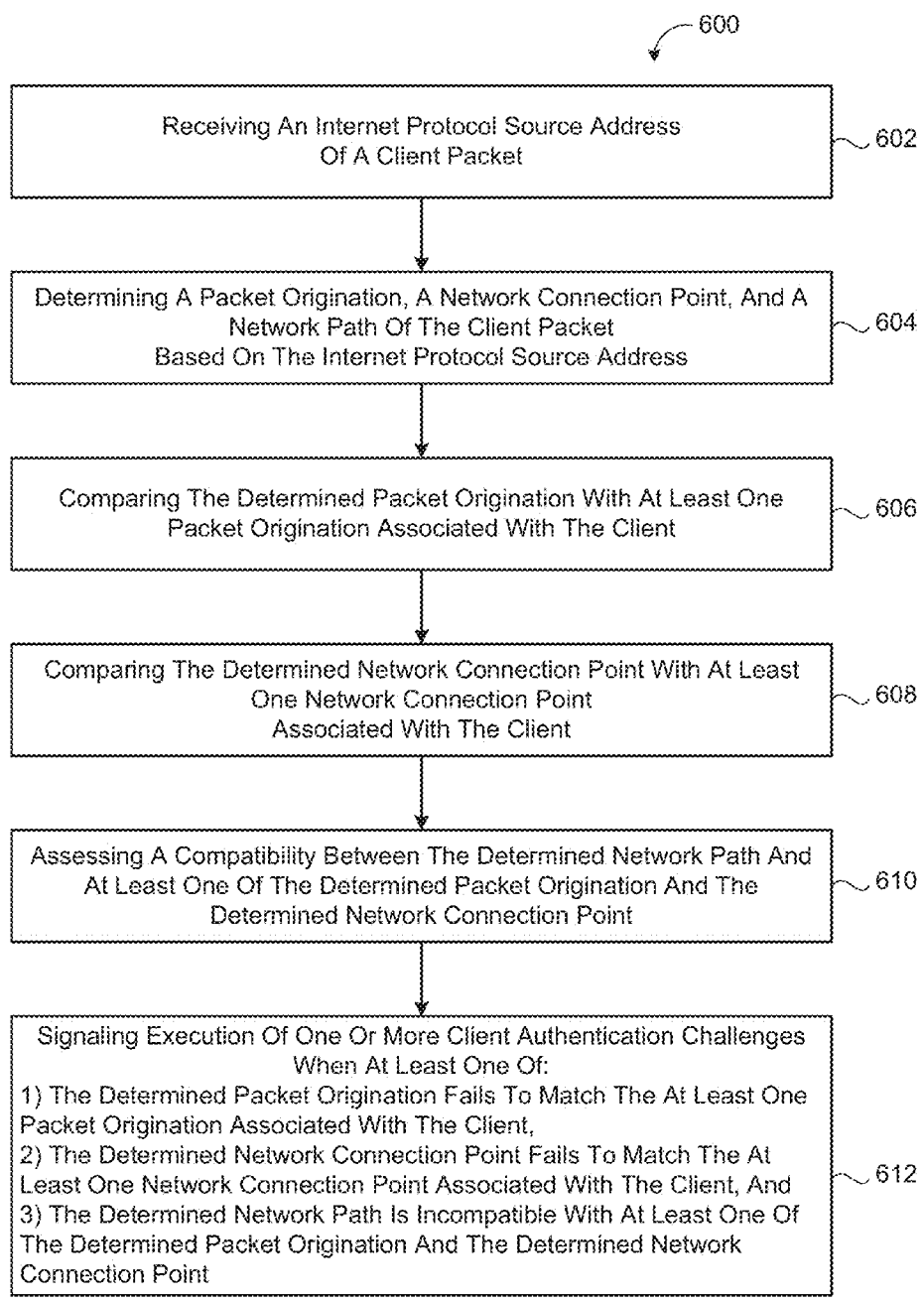
FIG. 6 provides an exemplary arrangement of operations for a method of client authentication.

FIG. 6 provides an exemplary arrangement 600 of operations for a method of client authentication. The method includes receiving 602 an IP source address 210 of a client packet 200 and determining 604 a packet origination 202, a network connection point 204, and a network path 206 of the client packet 200 based on the IP source address 210. For example, the method may include extracting a network prefix 212 from the IP source address 210 and determining at least one of the network origination 202, the network connection point 204, or the network path 206. The method further includes comparing 606 the determined packet origination 202 with at least one packet origination 202 associated with the client 30, comparing 608 the determined network connection point 204 with at least one network connection point 204 associated with the client 30, and assessing 610 a compatibility between the determined network path 206 and at least one of the determined packet origination 202 or the determined network connection point 204. The method includes signaling 612 execution of one or more client authentication challenges when 1) the determined packet origination 202 fails to match the at least one packet origination 202 associated with the client 30, 2) the determined network connection point 204 fails to match the at least one network connection point 204 associated with the client 30, and/or 3) the determined network path 206 is incompatible with at least one of the determined packet origination 202 or the determined network connection point 204.

In some implementations, the method includes querying the data source 50 to retrieve a geographical location corresponding to the IP source address 210. The method may include associating the packet origination 202 with the client 30 after successful execution of the one or more client authentication challenges. Moreover, the method may include disassociating the packet origination 202 from the client 30 after a threshold period of time $T_{max}$.

In some implementations, the method includes querying the data source 50 to retrieve the network connection point 204 corresponding to the IP source address 210. In some examples, the method includes determining a longest prefix match of the IP source address 210 to determine the network connection point 204. Moreover, an Internet service provider 40 can be determined for the network connection point 204. The method may include associating the network connection point 204 with the client 30 after successful execution of the one or more client authentication challenges. After a threshold period of time $T_{max}$, the method may include disassociating the network connection point 204 from the client 30.

The method may include determining a compatibility between the packet origination 202 and the network connection point 204 and signaling execution of one or more client authentication challenges when the packet origination 202 is incompatible with the network connection point 204. For example, the method may include determining an internet service provider 40 corresponding to the IP source address 210, determining whether the internet service provider 40 services the packet origination 202 and signaling execution of one or more client authentication challenges when the internet service provider 40 fails to service the packet origination 202. So, if the IP source address 210 of the packet 200 indicates that it should be originating from a first Internet service provider 40a, but the packet 200 actually originates from a location serviced by a second Internet service provider 40b, additional client authentication measures may be executed to verify the client 30.

In some implementations, the method includes comparing the IP source address 210 against a list of known unassigned IP addresses (i.e., an IP address not in service or not used by or assigned to any entity) and signaling execution of one or more client authentication challenges when the IP source address 210 matches an unassigned IP addresses. This allows a service provider 20 to quickly identify IP address spoofing.

The method may include determining a sequence of autonomous system identifiers $AS_n$ corresponding to the network path 206 of the client packet 200 and comparing the sequence of autonomous system identifiers $AS_n$ against a set of suspicious autonomous system identifiers $AS_n$. The method includes signaling execution of one or more client authentication challenges when at least one of the autonomous system identifiers $AS_n$ of the network path 206 matches a suspicious autonomous system identifier $AS_n$.

Referring again to FIG. 2B, malicious activity can be detected using the host interface identifier 214, which consists of the 64 least significant bits of a 128 bit IPv6 source address 210, when the host interface identifier 214 of the IPv6 address is automatically generated from a MAC address 216 of a network interface.

Ethernet and Wireless interfaces are generally assigned a Media Access Control (MAC) address 216, which are 48 bits wide. The MAC address 216 is a unique identifier assigned to a network interface for communications and is typically represented in a hexadecimal format where each hexadecimal byte represents four binary digits (bits).

The first three bytes of the MAC address 216 define an organizationally unique identifier 216a (OUI) and the last three bytes define an organization-specified extension identifier (OSEI) 216b. Manufacturers universally administer a uniquely assigned address (sometimes called a burned-in address) to a network device. The first three octets (in transmission order) identify the organization that issued the identifier, which is known as the organizationally unique identifier 216a (OUI).

Figure 2C:
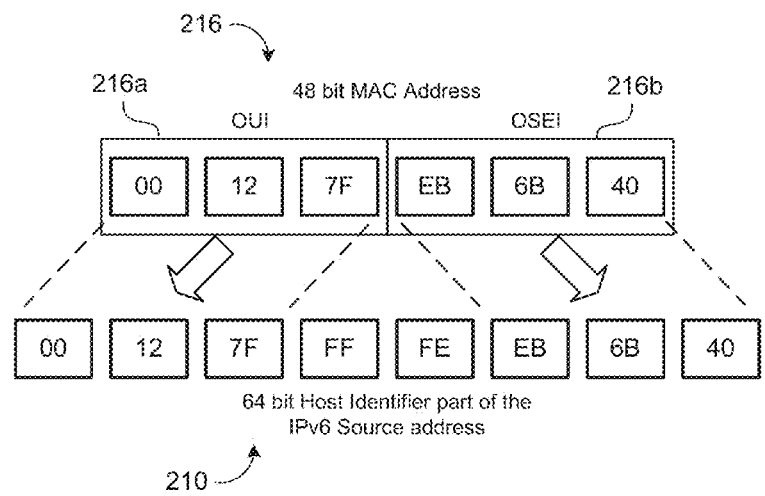
FIGS. 2C and 2D are schematic views of an exemplary 48 bit media control access (MAC) address being convertible to an EUI-64 address.
Figure 2D:
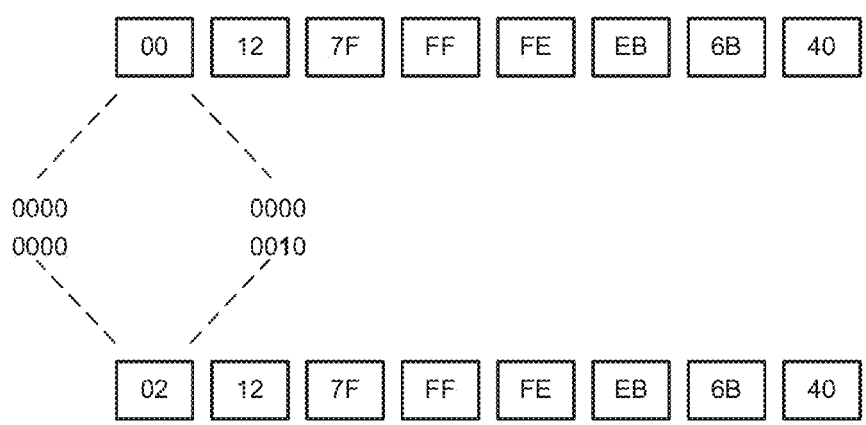

Referring to FIGS. 2C and 2D, a 48 bit MAC address 216 can be converted to a 64 bit EUI-64 source address 210 by separating the first three bytes (the OUI 216a) and the last three bytes (the OSEI 216b) and inserting two octets (e.g., FF-FF) therebetween. In other words, to convert a MAC-48 address into an EUI-64 address, copy the OUI 216a, append two octets FF-FF, and then copy the organization-specified extension identifier 216b. To convert an EUI-48 into an EUI-64, execute the same process, but insert FF-FE as the inserted two octets. For example, a MAC address 216 having hexadecimal digits 00:12.7F.EB.6B.40 can be converted to a EUI-64 address having hexadecimal digits 02:12.7F.FF.FE.EB.6B.40. This 64 bit quantity can be used as a host interface identifier 214. Similarly, a 48 bit MAC address 216 can be derived from a 64 bit host interface identifier 214 by concatenating the first and last three bytes (the OUI 216a and the OSEI 216b) of the hexadecimal address of the host interface identifier 214. The universal/local [U/L] bit can be toggled, as shown in FIG. 2D, to indicate whether the address is universally or locally administered.

Figure 7:
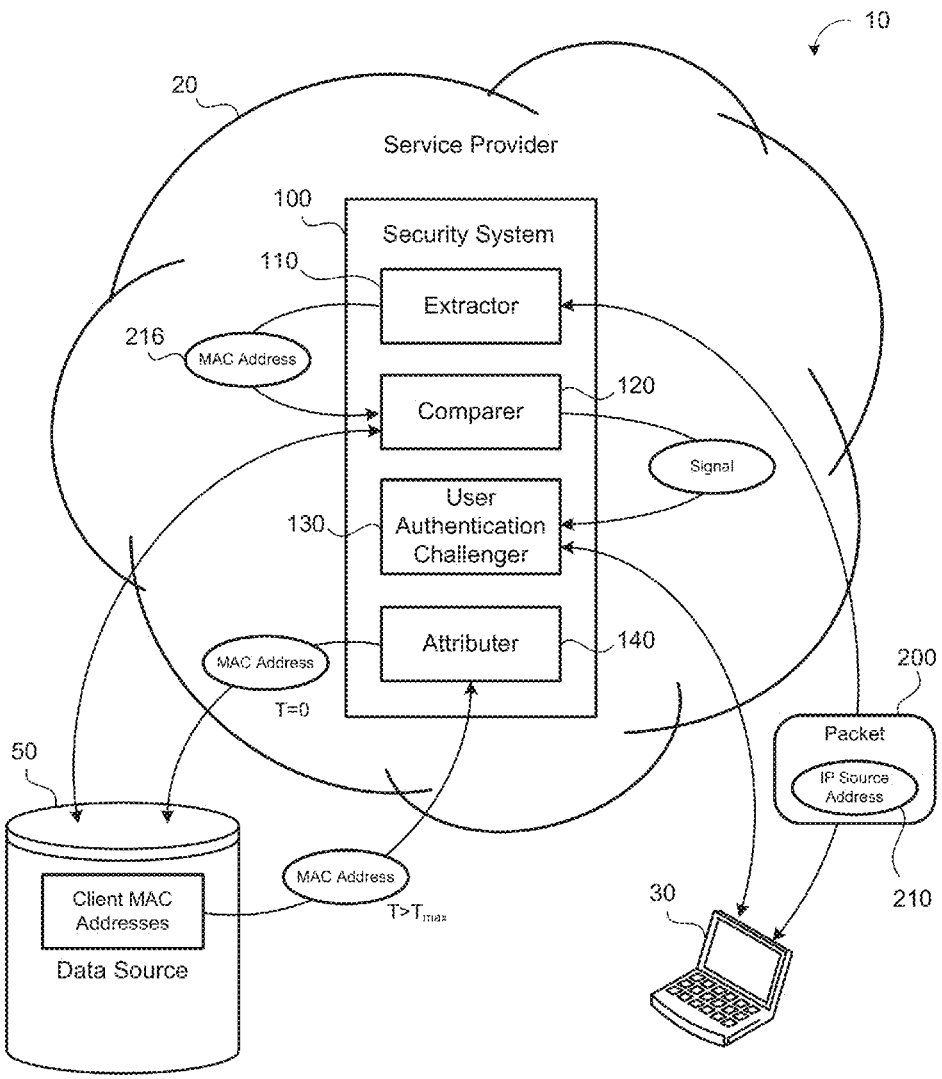
FIGS. 7 and 8 are schematic views of exemplary network systems.

Referring to FIG. 7, in some implementations, the security system 100 includes an extractor 110 and a comparer 120. When the service provider 20 receives a data packet 200 from a client 30, the security system 100 determines an authenticity of the client 30 (e.g., validates that the received data packet 200 originated from an authorized client). The extractor 110 receives the data packet 200 and extracts an Internet protocol (IP) source address 210 (e.g., an IPv6 address) of the client 30. In some examples, another module communicates the IP source address 210 to the extractor 110. The extractor 110 extracts a media access control (MAC) address 216 from the IP source address 210. In some examples, the extractor 110 identifies the host interface identifier 214 of the IP source address and concatenates the first and last three bytes (the OUI 216a and the OSEI 216b) of the hexadecimal address of the host interface identifier 214 to obtain the MAC address 216.

In some implementations, the comparer 120 compares the extracted MAC address 216 with at least one client MAC address 216 associated with the client 30. The security system 100 may store the client associated MAC addresses 216 in a data store 50 (e.g., storage device, local and/or remote memory, cloud storage, etc.). Based on the comparison, the comparer 120 signals execution of one or more client authentication challenges when the extracted MAC 216 fails to match the at least one MAC address 216 associated with the client 30. An authentication challenger 130 may receive the signals sent by the comparer 120 and execute multiple client authentication challenges, such as prompts for questions, passwords, keys, etc.

In some implementations, the attributer 140 that associates the extracted MAC address 216 with the client 30 after successful execution of the one or more client authentication challenges. Each associated MAC address may receive an age attribute having a time T of zero when initially associated. The attributer 140 may disassociate a MAC address 216 from the client 30 after a threshold period of time $T_{max}$, for example, an age T>3 weeks. Other threshold time periods are possible as well, such as 3 days, 3 months, 3 years, etc. Moreover, in some examples, the comparer 120 checks the ages of the client associated MAC addresses 216 when comparing the associated MAC addresses 216 with the extracted MAC address 216. If some or all of the associated MAC addresses 216 have an age within a threshold range of an expiration age, the comparer 120 may signal the authentication challenger 130 to execute multiple client authentication challenges.

Figure 8:
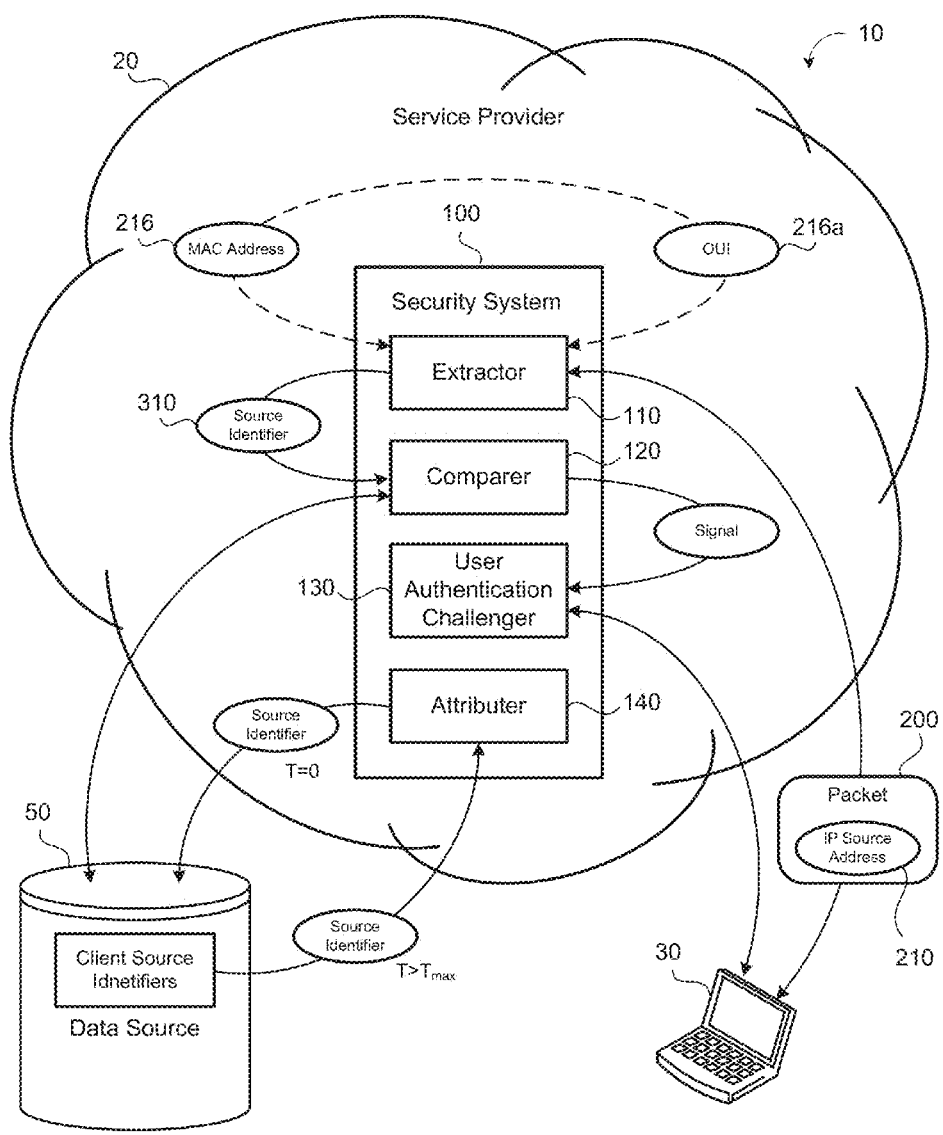

Referring to FIG. 8, in some implementations, the extractor 110 extracts an organizationally unique identifier (OUI) 216a from the MAC address 216 of the received IP source address 210 and may determine a source identifier 310 therefrom, such as an entity identity, a source device type, and/or a source device unique identifier. In some examples, the extractor 110 communicates with one or more data stores 50 (e.g., database, lookup table(s), data object, etc.) to determine the entity identity (e.g., name and/or contact information), the source device type (e.g., manufacturer, device model, etc.) and/or the source device unique identifier (e.g., serial number or unique identifier). For example, for a MAC address 216 of 10:9a:dd:b4:57:c9, the OUI 216a is 10:9a:dd and the OSEI 216b is b4:57:c9. Based on the OUI 216a, the extractor 110 may determine a manufacture (e.g., Apple®) and a device type (e.g., MacBook Pro) of the client 30 (e.g., by querying a database). Moreover, the OSEI 216b of b4:57:c9 provides the source device unique identifier.

The comparer 120 may compare the determined source identifier 310 with at least one source identifier 310 associated with the client 30 and signal execution of one or more client authentication challenges when the determined source identifier 310 fails to match the at least one source identifier 310 associated with the client 30. For example, if the received data packet 200 originated from a Dell® computer versus an Apple® MacBookPro, which was previously stored as a source identifier 310 of the client 30, the comparer 120 may signal to the authentication challenger 130 to execute additional client authentication challenges to authenticate the new client device.

The attributer 140 may associate the source identifier 310 with the client 30 after successful execution of the one or more client authentication challenges. Moreover, as with the MAC address 216, the attributer 140 may disassociate a source identifier 310 from the client 30 after a threshold period of time $T_{max}$.

In some implementations, the extractor 110 determines a source device type and a source software application type from the MAC address 216. The comparer 120 may compare a compatibility between the determined source device type and the determined source software application type and signal the authentication challenger 130 to execute one or more client authentication challenges when the determined source device type is incompatible with the determined source software application type. For example, if the software application type is a mobile device application that does not run on a desktop computer, yet the extractor 110 can determine from the MAC address 216 that the data packet 200 originated from a desktop computer, the comparer 120 may signal to challenge the authenticity of the client 30.

Figure 9:
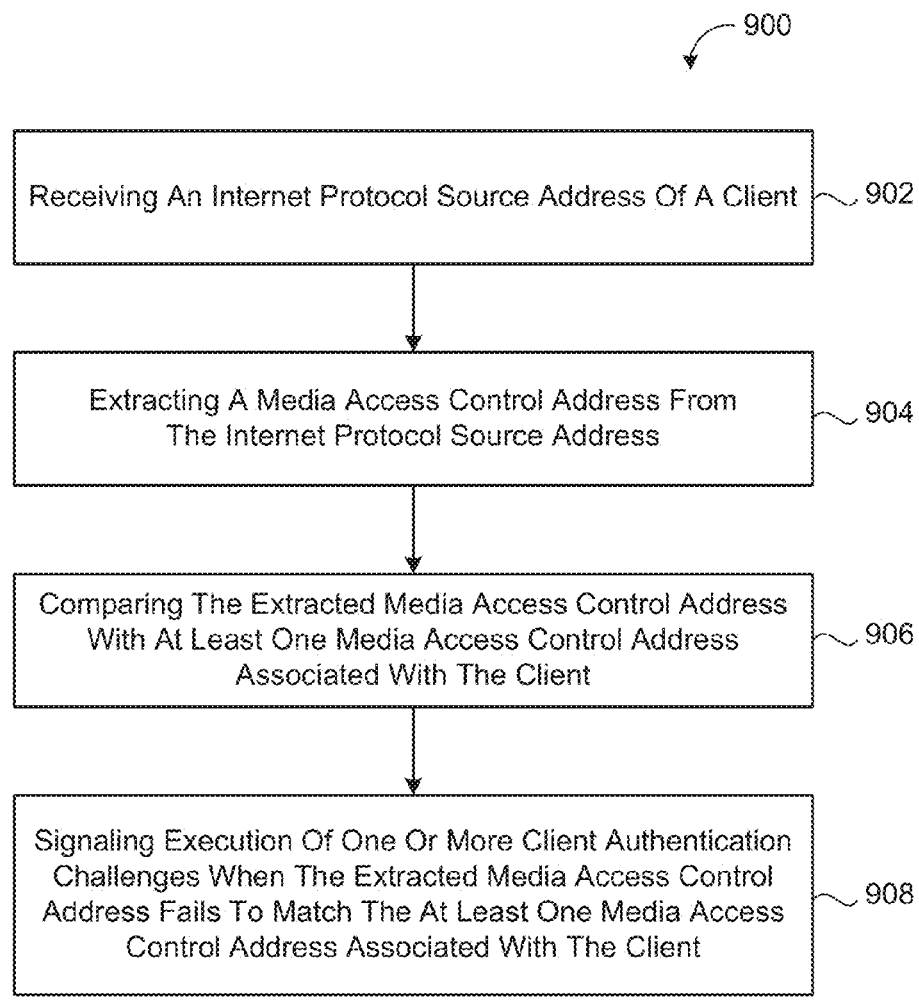
FIG. 9 provides an exemplary arrangement of operations for a method of client authentication.

FIG. 9 provides an exemplary arrangement 900 of operations for a method of client authentication. The method includes receiving 902 an Internet protocol (IP) source address 210 (e.g., an IPv6 address) of a client 30, extracting 904 a media access control (MAC) address 216 from the IP source address 210, comparing 906 the extracted MAC address 216 with at least one MAC address 216 associated with the client 30, and signaling 908 execution of one or more client authentication challenges when the extracted MAC address 216 fails to match the at least one MAC address 216 associated with the client 30.

In some implementations, the method includes extracting an interface identifier 214 from the IP source address 210 and extracting the MAC address 216 from the interface identifier 214. The method may include associating the extracted MAC address 216 with the client 30 after successful execution of the one or more client authentication challenges. Moreover, an age T can be attributed to the extracted MAC address 216, such that the method may include disassociating the MAC address 216 from the client 30 after a threshold period of time $T_{max}$ (e.g., an age of 2-6 months).

In some implementations, the method includes extracting an organizationally unique identifier (OUI) 216a from the MAC address 216. A source identifier 310 can be determined from the OUI 216a, such as an entity identity, a source device type, and a source device unique identifier. The method may include comparing the determined source identifier 310 with at least one source identifier 310 associated with the client 30 and signaling execution of one or more client authentication challenges when the determined source identifier 310 fails to match the at least one source identifier 310 associated with the client 30. The method may include associating the determined source identifier 310 with the client 30 after successful execution of the one or more client authentication challenges. Moreover, the determined source identifier 310 can be disassociated from the client 30 after a threshold period of time $T_{max}$.

The method, in some implementations, includes determining a source device type and a source software application type from the MAC address 216 and then comparing a compatibility between the determined source device type and the determined source software application type. The method may include signaling execution of one or more client authentication challenges when the determined source device type is incompatible with the determined source software application type.

Figure 10:
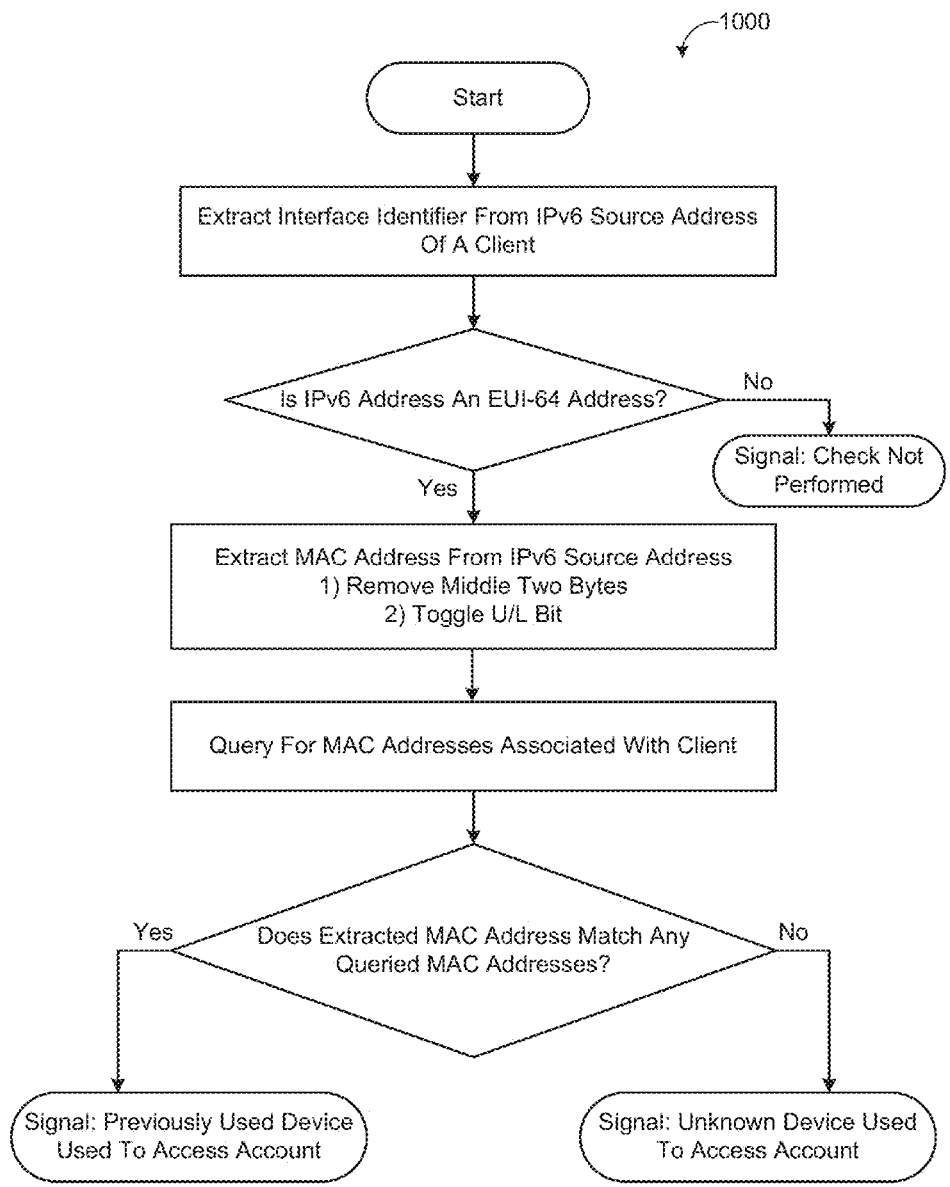
FIG. 10 provides a schematic view of an exemplary flow chart for authenticating a client.

FIG. 10 provides a schematic view of an exemplary flow chart 1000 of operations for authenticating a client 30. In some implementations, the operations include extracting a host interface identifier 214 from a received IPv6 source address 210. If the IPv6 source address 210 is not an EUI-64 address, then signal (e.g., to the authentication challenger 130) that the check cannot be completed. Otherwise, the operations include extracting a MAC address 216 from the IPv6 source address 210. In some examples, the operations include removing the middle two bytes from the IPv6 source address 210 and toggling the u/l bit (see e.g., FIGS. 2C and 2D), resulting in the MAC address 216. The operations further include querying for MAC addresses 216 associated with the client 30 (e.g., by querying the data source 50). If the extracted MAC address 216 matches a queried MAC address 216, the operations include signaling that the client 30 is using a previously authenticated device, which may result in no further client authentication challenges. Otherwise, the operations include signaling that the client 30 is using an unknown device, which may result in further client authentication challenges to make sure that an attacker is not using packet header forgery.

Figure 11:
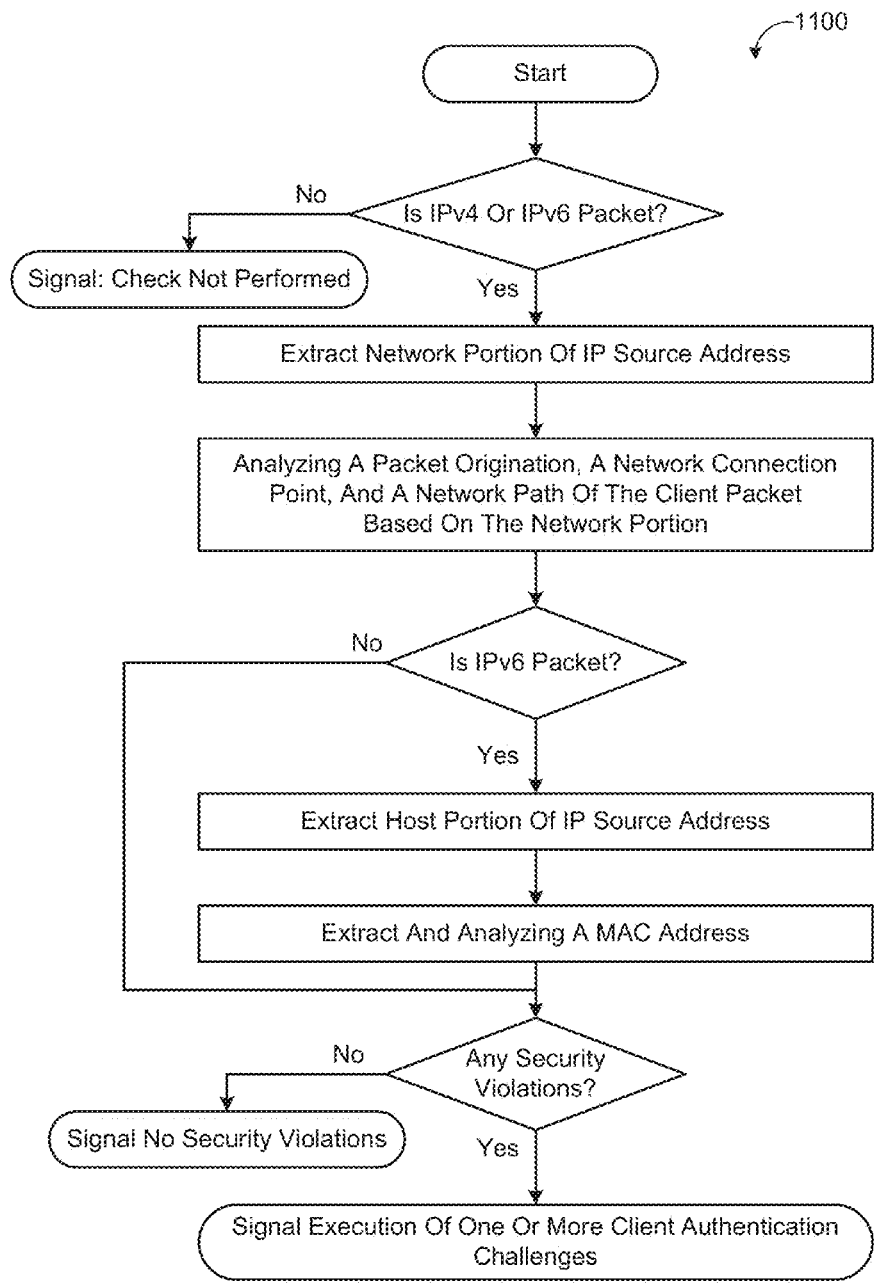
FIG. 11 provides a schematic view of an exemplary flow chart for authenticating a client.

FIG. 11 provides a schematic view of an exemplary flow chart 1100 of operations for authenticating a client 30. In some implementations, the operations include receiving a data packet 200 and if the data packet 200 is an IPv4 or an IPv6 packet, extracting a network prefix 212 of an IP source address 210 of the data packet 200. The operations further include analyzing a packet origination 202, a network connection point 204, and a network path 206 of the client packet 200 based on the network prefix 212 of the IP source address 210. For example, the operations may include determining a packet origination 202, a network connection point 204, and a network path 206 of the client packet 200 based on the network prefix 212, comparing the determined packet origination 202 with at least one packet origination 202 associated with the client 30, comparing 608 the determined network connection point 204 with at least one network connection point 204 associated with the client 30, and assessing 610 a compatibility between the determined network path 206 and at least one of the determined packet origination 202 or the determined network connection point 204.

The operations further include, if the data packet 200 is an IPv6 data packet, extracting a host portion 214 of the IP source address 210, and extracting and analyzing a MAC address 216. For example, this may include querying for MAC addresses 216 previously associated with the client 30 and comparing the extracted MAC address 216 with queried MAC addresses 216. In some implementations, the operations include determine a source identifier 310 from the MAC address 216 and comparing the source identifier 310 and against any previously associated source identifiers 310 of the client 30.

If any of the comparisons results in security violations, the operations include signaling for execution of multiple client authentication challenges. In some examples, the operations include signaling execution of one or more client authentication challenges when 1) the determined packet origination 202 fails to match the at least one packet origination 202 associated with the client 30, 2) the determined network connection point 204 fails to match the at least one network connection point 204 associated with the client 30, and/or 3) the determined network path 206 is incompatible with at least one of the determined packet origination 202 or the determined network connection point 204. Moreover, if the extracted MAC address 216 fails to match a queried MAC address 216, the operations include signaling execution of multiple client authentication challenges, because the client 30 is using a previously authenticated device. Similarly, if a determined source identifier 310 of the MAC address 216 fails to match a previously associated source identifier 310 of the client 30, the operations may include signaling execution of multiple client authentication challenges.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a client, one or more aspects of the disclosure can be implemented on a computer having a display device, e.g., a CRT (cathode ray tube), LCD (liquid crystal display) monitor, or touch screen for displaying information to the client and optionally a keyboard and a pointing device, e.g., a mouse or a trackball, by which the client can provide input to the computer. Other kinds of devices can be used to provide interaction with a client as well; for example, feedback provided to the client can be any form of sensory feedback, e.g., visual feedback, auditory feedback, or tactile feedback; and input from the client can be received in any form, including acoustic, speech, or tactile input. In addition, a computer can interact with a client by sending documents to and receiving documents from a device that is used by the client; for example, by sending web pages to a web browser on a client's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical client interface or a Web browser through which a client can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving client input from a client interacting with the client device). Data generated at the client device (e.g., a result of the client interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of client authentication, the method comprising:
   receiving an Internet protocol source address of a client packet;
   determining a packet origination, a network connection point, and a network path of the client packet based on the Internet protocol source address;
   comparing the determined packet origination with at least one packet origination associated with the client;
   comparing the determined network connection point with at least one network connection point associated with the client;
   assessing a compatibility between the determined network path and at least one of the determined packet origination or the determined network connection point;
   determining a compatibility between the packet origination and the network connection point;
   determining an internet service provider corresponding to the Internet protocol source address;
   determining whether the internet service provider services the packet origination; and
   signaling execution of one or more client authentication challenges when at least one of:
      the determined packet origination fails to match the at least one packet origination associated with the client,
      the determined network connection point fails to match the at least one network connection point associated with the client,
      the determined network path is incompatible with at least one of the determined packet origination and the determined network connection point,
      the packet origination is incompatible with the network connection point, or
      the internet service provider fails to service the packet origination.

2. The method of claim 1, wherein the packet origination comprises at least one of a geographical location, a domain name, a connection speed, an Internet service provider, or an entity identification.

3. The method of claim 1, further comprising querying a data source to retrieve at least one of a geographical location or the network connection point corresponding to the Internet protocol source address.

4. The method of claim 1, further comprising:
   associating the packet origination with the client after successful execution of the one or more client authentication challenges; and
   disassociating the packet origination from the client after a threshold period of time.

5. The method of claim 1, further comprising determining a longest prefix match of the Internet protocol source address to determine the network connection point.

6. The method of claim 1, further comprising determining a service provider corresponding to the network connection point.

7. The method of claim 1, further comprising:
   associating the network connection point with the client after successful execution of the one or more client authentication challenges; and
   disassociating the network connection point from the client after a threshold period of time.

8. The method of claim 1, further comprising:
   extracting a network prefix from the Internet protocol source address; and
   determining at least one of the network origination, the network connection point, or the network path.

9. The method of claim 1, further comprising:
   comparing the Internet protocol source address against a list of known unassigned Internet protocol addresses; and
   signaling execution of one or more client authentication challenges when the Internet protocol source address matches an unassigned Internet protocol addresses.

10. A method of client authentication, the method comprising:
    receiving an Internet protocol source address of a client packet;
    determining a packet origination, a network connection point, and a network path of the client packet based on the Internet protocol source address;
    comparing the determined packet origination with at least one packet origination associated with the client;
    comparing the determined network connection point with at least one network connection point associated with the client;
    assessing a compatibility between the determined network path and at least one of the determined packet origination or the determined network connection point;
    determining a sequence of autonomous system identifiers corresponding to the network path of the client packet;

comparing the autonomous system identifiers of the network path against a set of suspicious autonomous system identifiers; and signaling execution of one or more client authentication challenges when at least one of:
- the determined packet origination fails to match the at least one packet origination associated with the client,
- the determined network connection point fails to match the at least one network connection point associated with the client,
- the determined network path is incompatible with at least one of the determined packet origination and the determined network connection point, or
- the autonomous system identifiers of the network path matches a suspicious autonomous system identifier.

11. A security system comprising:
a data processor executing:
an extractor receiving an Internet protocol source address of a client packet, the extractor determining a packet origination, a network connection point, an internet service provider corresponding to the Internet protocol source address, and a network path of the client packet based on the Internet protocol source address; and
a comparer in communication with the extractor, the comparer:
comparing the determined packet origination with at least one packet origination associated with the client;
comparing the determined network connection point with at least one network connection point associated with the client;
assessing a compatibility between the determined network path and at least one of the determined packet origination or the determined network connection point;
determining whether the internet service provider services the packet origination; and
signaling execution of one or more client authentication challenges when at least one of:
- the determined packet origination fails to match the at least one packet origination associated with the client,
- the determined network connection point fails to match the at least one network connection point associated with the client,
- the determined network path is incompatible with at least one of the determined packet origination and the determined network connection point, or
- the internet service provider fails to service the packet origination.

12. The security system of claim 11, wherein the packet origination comprises at least one of a geographical location, a domain name, a connection speed, an Internet service provider, or an entity identification.

13. The security system of claim 11, wherein the extractor queries a data source to retrieve at least one of a geographical location or the network connection point corresponding to the Internet protocol source address.

14. The security system of claim 11, further comprising an attributer associating the packet origination with the client after successful execution of the one or more client authentication challenges and disassociating the packet origination from the client after a threshold period of time.

15. The security system of claim 11, wherein the extractor determines a longest prefix match of the Internet protocol source address to determine the network connection point.

16. The security system of claim 11, wherein the extractor determines a service provider corresponding to the network connection point.

17. The security system of claim 11, further comprising an attributer associating the network connection point with the client after successful execution of the one or more client authentication challenges and disassociating the network connection point from the client after a threshold period of time.

18. The security system of claim 11, wherein the extractor:
extracts a network prefix from the Internet protocol source address; and
determines at least one of the network origination, the network connection point, or the network path.

19. The security system of claim 11, wherein the comparer:
determines a compatibility between the packet origination and the network connection point; and
signals execution of one or more client authentication challenges when the packet origination is incompatible with the network connection point.

20. The security system of claim 11, wherein the comparer:
compares the Internet protocol source address against a list of known unassigned Internet protocol addresses; and
signals execution of one or more client authentication challenges when the Internet protocol source address matches an unassigned Internet protocol addresses.

21. A security system comprising:
a data processor executing:
an extractor receiving an Internet protocol source address of a client packet, the extractor determining a packet origination, a network connection point, a network path of the client packet based on the Internet protocol source address, and a sequence of autonomous system identifiers corresponding to the network path of the client packet; and
a comparer in communication with the extractor, the comparer:
comparing the determined packet origination with at least one packet origination associated with the client;
comparing the determined network connection point with at least one network connection point associated with the client;
assessing a compatibility between the determined network path and at least one of the determined packet origination or the determined network connection point;
comparing the autonomous system identifiers of the network path against a set of suspicious autonomous system identifiers; and
signaling execution of one or more client authentication challenges when at least one of:
- the determined packet origination fails to match the at least one packet origination associated with the client,
- the determined network connection point fails to match the at least one network connection point associated with the client,
- the determined network path is incompatible with at least one of the determined packet origination and the determined network connection point, or
- the autonomous system identifiers of the network path matches a suspicious autonomous system identifier.

22. A computer program product encoded on a non-transitory computer readable storage medium comprising instructions that when executed by a data processing apparatus cause the data processing apparatus to perform operations comprising:
- receiving an Internet protocol source address of a client packet;
- determining a packet origination, a network connection point, and a network path of the client packet based on the Internet protocol source address;
- comparing the determined packet origination with at least one packet origination associated with the client;
- comparing the determined network connection point with at least one network connection point associated with the client;
- assessing a compatibility between the determined network path and at least one of the determined packet origination or the determined network connection point;
- determining a compatibility between the packet origination and the network connection point;
- determining an internet service provider corresponding to the Internet protocol source address;
- determining whether the internet service provider services the packet origination;
- comparing the Internet protocol source address against a list of known unassigned Internet protocol addresses; and
- signaling execution of one or more client authentication challenges when at least one of:
  - the determined packet origination fails to match the at least one packet origination associated with the client,
  - the determined network connection point fails to match the at least one network connection point associated with the client,
  - the determined network path is incompatible with at least one of the determined packet origination or the determined network connection point,
  - the packet origination is incompatible with the network connection point,
  - the internet service provider fails to service the packet origination, or
  - the Internet protocol source address matches an unassigned Internet protocol addresses.

23. The computer program product of claim 22, wherein the performed operations further comprise:
- querying a data source to retrieve a geographical location corresponding to the Internet protocol source address; and
- querying a data source to retrieve the network connection point corresponding to the Internet protocol source address.

24. The computer program product of claim 22, wherein the performed operations further comprise:
- associating the packet origination and the network connection point with the client after successful execution of the one or more client authentication challenges; and
- disassociating the packet origination and the network connection point from the client after a threshold period of time.

25. The computer program product of claim 22, wherein the performed operations further comprise:
- determining a longest prefix match of the Internet protocol source address to determine the network connection point;
- determining a service provider corresponding to the network connection point;
- extracting a network prefix from the Internet protocol source address; and
- determining at least one of the network origination, the network connection point, or the network path.

26. A computer program product encoded on a non-transitory computer readable storage medium comprising instructions that when executed by a data processing apparatus cause the data processing apparatus to perform operations comprising:
- receiving an Internet protocol source address of a client packet;
- determining a packet origination, a network connection point, and a network path of the client packet based on the Internet protocol source address;
- comparing the determined packet origination with at least one packet origination associated with the client;
- comparing the determined network connection point with at least one network connection point associated with the client;
- assessing a compatibility between the determined network path and at least one of the determined packet origination or the determined network connection point;
- determining a sequence of autonomous system identifiers corresponding to the network path of the client packet;
- comparing the autonomous system identifiers of the network path against a set of suspicious autonomous system identifiers; and
- signaling execution of one or more client authentication challenges when at least one of:
  - the determined packet origination fails to match the at least one packet origination associated with the client,
  - the determined network connection point fails to match the at least one network connection point associated with the client,
  - the determined network path is incompatible with at least one of the determined packet origination or the determined network connection point, or
  - the autonomous system identifiers of the network path matches a suspicious autonomous system identifier.

* * * * *